United States Patent [19]

Satoh et al.

[11] Patent Number: 5,119,363
[45] Date of Patent: Jun. 2, 1992

[54] OPTICAL DISK HAVING AN INDEX MARK

[75] Inventors: Isao Satoh; Tomio Yoshida; Shunji Ohara; Kenji Koishi, all of Osaka, Japan

[73] Assignee: Matsushita Electric Industrial Company, Ltd., Japan

[21] Appl. No.: 331,326

[22] Filed: Dec. 16, 1981

[30] Foreign Application Priority Data

Dec. 17, 1980 [JP] Japan ................... 55-179166
Dec. 17, 1980 [JP] Japan ................... 55-179167
Apr. 16, 1981 [JP] Japan ................... 56-58267

[51] Int. Cl.$^5$ .......................... G11B 7/24; G11B 7/00
[52] U.S. Cl. ................................. 369/275.3; 369/50; 369/52
[58] Field of Search .............. 365/234; 369/47, 52, 369/275, 278, 30, 44, 50, 189, 239, 276, 275.1, 275.3, 275.4, 48, 49; 358/342; 360/49, 73, 77, 72.1

[56] References Cited

U.S. PATENT DOCUMENTS

| | | |
|---|---|---|
| 3,819,281 | 6/1974 | Hoque et al. |
| 3,931,457 | 1/1976 | Mes ........................... 360/19 |
| 4,000,510 | 12/1976 | Cheney et al. ............... 360/19 |
| 4,094,010 | 6/1978 | Pepperl et al. ............. 369/47 X |
| 4,094,013 | 6/1978 | Hill et al. .................. 365/234 |
| 4,108,365 | 8/1978 | Hughes ....................... 369/30 |
| 4,142,209 | 2/1979 | Hedlund et al. ........... 369/47 X |
| 4,229,808 | 10/1980 | Hui ............................ 365/234 |
| 4,238,843 | 12/1980 | Carrosso et al. ........ 358/342 X |
| 4,245,247 | 1/1981 | Fike et al. ................. 358/342 |
| 4,296,491 | 10/1981 | Jerome ....................... 369/275 |
| 4,326,282 | 4/1982 | Verboom et al. ........ 369/275 X |
| 4,329,575 | 5/1982 | Roach ........................ 369/275 |
| 4,363,116 | 12/1982 | Kleuters et al. ........ 369/275 X |

FOREIGN PATENT DOCUMENTS

| | | |
|---|---|---|
| 1231454 | 4/1965 | Fed. Rep. of Germany ........ 369/52 |
| 2102876 | 8/1972 | Fed. Rep. of Germany ... 369/275 X |
| 2045997 | 11/1980 | United Kingdom . |
| 2058434 | 4/1981 | United Kingdom . |

Primary Examiner—Aristotelis Psitos
Assistant Examiner—Steven R. Garland
Attorney, Agent, or Firm—Lowe, Price, LeBlanc & Becker

[57] ABSTRACT

In an optical recording disk having groove-like guide tracks, a rotation index mark is provided to indicate a rotation starting point where the rotation index mark is constructed of a grooved-like phase structure. The rotation index mark may be formed in a track which is located separated from the information recording tracks, and may be detected optically without using a laser light beam. The rotation index mark is used to control the rotation of the disk as well as writing and reading operation of an optical disk recording/reproducing apparatus so that various information, such as video signals, can be accurately recorded and reproduced. In the case of recording digital signals, the guide tracks may be divided into a plurality of sector regions, and sector index marks corresponding to respective sector regions may also be formed together with the rotation index mark. Furthermore, an address index mark indicative of the position of track address region radially formed in the guide tracks may also be added.

25 Claims, 11 Drawing Sheets

OPTICAL DISK HAVING AN INDEX MARK

BACKGROUND OF THE INVENTION

This invention relates generally to optical disks for recording and reproducing various information signals, such as a video signal, thereon and therefrom by means of an optical disk recording/reproducing apparatus.

Various types of optical disk recording/reproducing apparatus have been known hitherto, and in one type thereof an optical disk, coated with a recording material by spraying or vapor deposition, is rotated, and a tiny spot of laser light beam, which is focussed so that the diameter is less than 1 micrometer, is applied on the optical disk. The intensity of the laser light to be emitted from a laser light source is modulated by a recording signal so that recording of a video signal or a digital signal can be effected in real-time operation as an optical characteristic change such as variation in refractive index, for instance, phase variation by concave-convexo portions on the optical disk, or variation in reflection factor or in transmittance by light and shade variation or formation of holes. The optical characteristic change on the disk will be detected to reproduce prerecorded information.

In such apparatus, structure of an optical disk has been known where recording tracks are formed on an optical disk in advance and then a recording material is formed thereon by spraying or vapor deposition, as a method for actualizing high density of recording tracks, partial writing or erasing at random places, and for removing influence due to vibrations of the disk. Recording or writing is effected by recording information on the groove-like guide tracks, which have been dug or grooved on the surface of an optical disk, in such a manner that tracking control is effected so as to follow the zigzag motion caused by the eccentricity of the guide tracks with the above-mentioned tiny spot focussed on the groove-like track. Since the track density of the guide tracks is defined by the pitch of the guide tracks to be formed irrespective of the eccentricity of the optical disk, a disk of an extremely high density can be manufactured. For instance, a disk having a diameter of 30 centimeters can contain 20,000 to 40,000 coaxial tracks. Since such a large capacity optical disk is capable of containing 20,000 to 40,000 frames of TV (television) pictures, address information is necessary to selectively pickup necessary information. The address information is assigned to all the tracks as serial numbers from the inner-most track to the outer-most track or vice versa.

The address data, of respective tracks are aligned radially where the address datum of each track is formed in the form of an arc subtending a given angle with respect to the center of the disk. Therefore, it is necessary to prevent other information from being recorded on the region carrying the address data. Furthermore, it is also necessary to control the rotation of the optical disk by matching the phase of the vertical synchronous signal of a TV picture signal with the phase of the address information region, so that a TV picture signal is recorded after the end of the address information region in the case of recording a single frame of a TV picture, for example. To this end, an optical disk requires a mark indicative of the position of the starting point of rotation. Although the address information region may be used as such a mark, it is not practical to do so because a detection signal, obtained as a result of searching a track by moving the tiny spot of light at high speed, suffers from irregularity due to noises.

On the other hand, since digital information does not have a predetermined length as does a TV picture, a problem would occur if only address information is provided. Therefore, each track is divided into a plurality of information regions for controlling the digital information. This information region is called a sector, and respective sectors are numbered so that serial numbers are assigned to consecutive sectors in each track. With this arrangement, each sector in the optical disk can be readily designated by its track address and sector address.

It is advantageous to form each of the track address information and the sector address information as a groove-like portion on the optical disk together with the guide tracks in view of manufacturing technique inasmuch as optical disks having guide tracks can be manufactured by stamping in the same process for manufacturing VLP (trademark) disks.

The above-mentioned index mark has been provided hitherto by adhering a piece of aluminum film or vapor-depositing a mirror surface. Therefore, the positional accuracy of the index mark on an optical disk is not very high, while productivity of optical disks is low.

SUMMARY OF THE INVENTION

The present invention has been developed in order to remove the various above-mentioned disadvantages and drawbacks inherent to the conventional optical disks.

It is, therefore, an object of the present invention to provide a new and useful optical disk having an index mark indicative of a starting point of the rotation of the disk where the index mark can be readily formed together with groove-like guide tracks by stamping, so that the positional accuracy of the index mark is very high while productivity of optical disks can be improved.

According to a feature of the present invention, other index marks indicative of sectors of an optical disk and indicative of the position of address information, may also be formed in the same manner as the first mentioned index mark.

According to another feature of the present invention, the various index marks mentioned in the above can be detected by using an incoherent light source, such as a light-emitting diode, without using a laser light source.

In accordance with the present invention there is provided an optical disk for optically recording and reproducing information thereon and therefrom, comprising: a substrate; a recording layer deposited on at least one side of said substrate; and a rotation index mark indicative of a starting point of the rotation of said disk, said index mark being constructed of a groove-like phase structure within said substrate and said recording layer.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like numerals throughout the drawings.

DETAILED DESCRIPTION OF THE INVENTION

Figure 1:
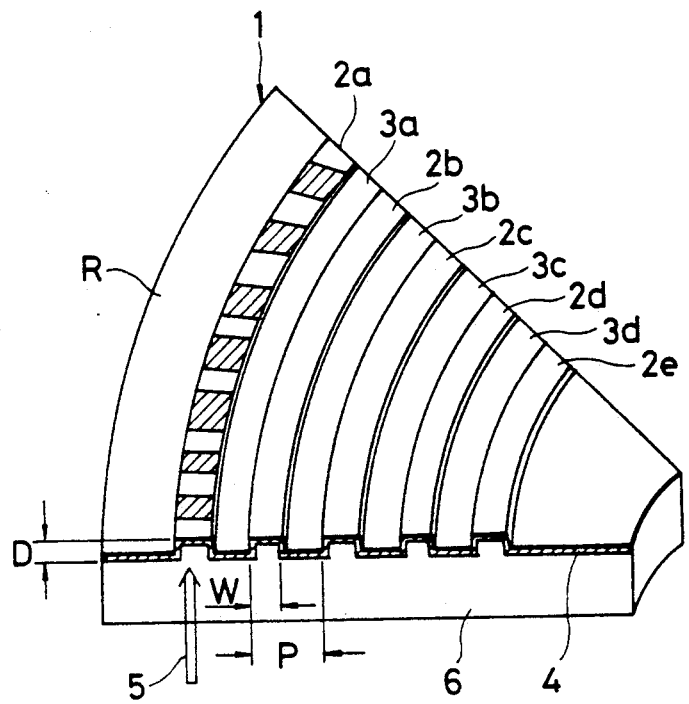
FIG. 1 is a schematic partial perspective view of an optical disk to which the present invention is adapted.

FIG. 1 shows the structure of groove-like guide tracks formed in an optical disk to which the present invention is adapted. In FIG. 1, grooves 2a, 2b, 2c . . . 2e are made on one side R of an optical disk 1 where each groove has a width W, a pitch P and a depth D. The grooves 2a to 2e constitute guide grooves, and are formed coaxially or spirally. Adjacent grooves are separated by flat portions 3a to 3d each provided between adjacent grooves. A recording material is vapor deposited onto the side R so as form a recording layer 4. A tiny spot lights from a suitable light beam source is applied from the side of a substrate 6 in this example so as to be focussed on the side R to record information. The portion where information is recorded or written is the bottom (i.e. the upper side in FIG. 1) of respective grooves of the tracks 2a to 2e. An example of pits of light and shade is shown to be recorded at the bottom of the guide track 2a.

Figure 2:
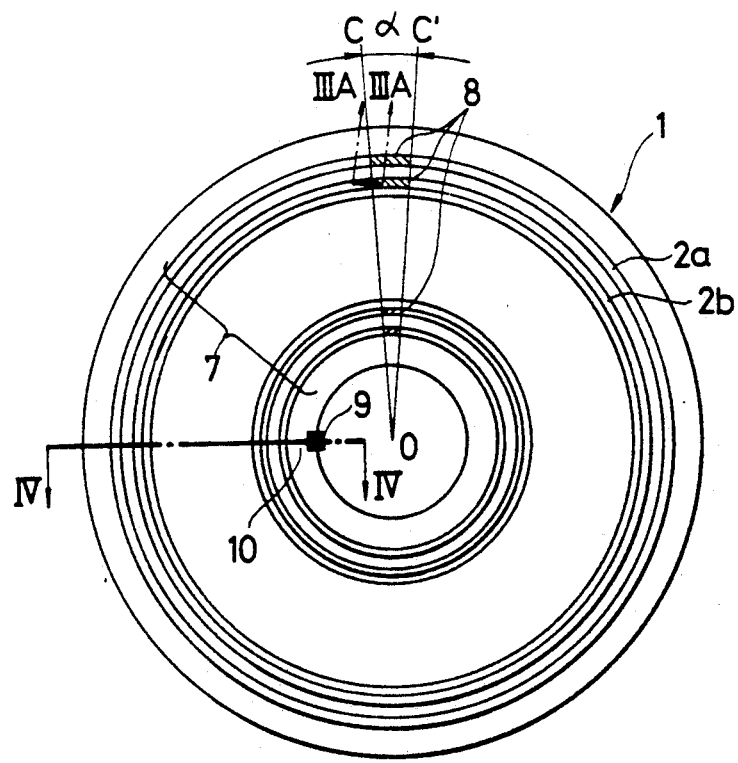
FIG. 2 is a schematic top plan view of an embodiment of an optical disk according to the present invention.

An embodiment of the present invention is shown in FIG. 2 which have the same guide tracks as shown in FIG. 1. The embodiment will be described with reference to a top plan view of FIG. 2, a cross-sectional view of FIG. 3A, a top plan view of FIG. 3B corresponding to FIG. 3A, another cross-sectional view of FIG. 4, and perspective views of FIGS. 5A and 5B showing the structure of an index mark. The cross-sections of FIGS. 3A and 4 are views respectively taken along the lines IIIA—IIIA and IV—IV of FIG. 2.

The optical disk 1 of FIG. 2 comprises a track region 7 having groove-like guide tracks, track address regions 8 each formed in each of the guide tracks, and an index mark 9 indicative of a point of rotation start. The track address regions 8 are aligned radially with respect to the center O of the optical disk 1 so that each track address region 8 has a form of an arc or sector having an angle α. In detail, the track address information is recorded as concave-convexo pits in the form of FM or PE (pulse-encoded) modulated signals in each track defined between lines CO an C'O.

Figure 3A:
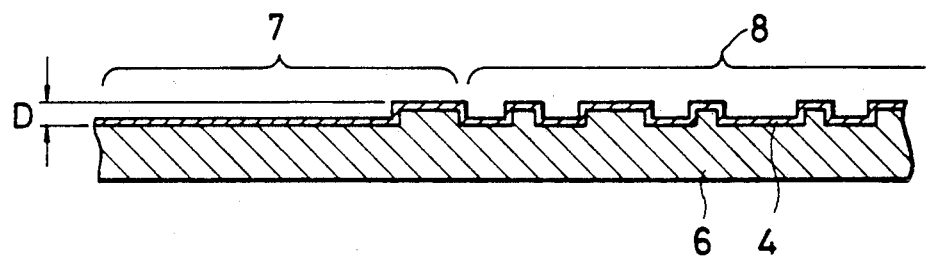
FIG. 3A is a schematic partial cross-sectional view of the optical disk of FIG. 2 taken along the line IIIA—IIIA, showing the structure of guide tracks.
Figure 3B:
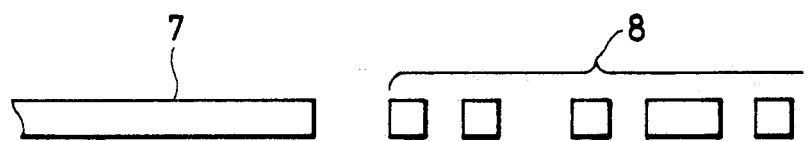
FIG. 3B is a schematic top plan view of the guide tracks of FIG. 3A.

FIG. 3A is an enlarged cross-sectional view of the disk 1 of FIG. 2 for showing the structure of the track address region 8, and a top plan view corresponding to FIG. 3A is shown in FIG. 3B . The depth D of the grooves is selected to be one eighth of the wavelength in view of the detection of error signal and reading operation by reflection. The address information is formed as repetitive concave grooves in the form of pits having a depth of D, and will be read out as change in the amount of reflecting light diffracted in accordance with the presence and absence of the groove.

Figure 4:
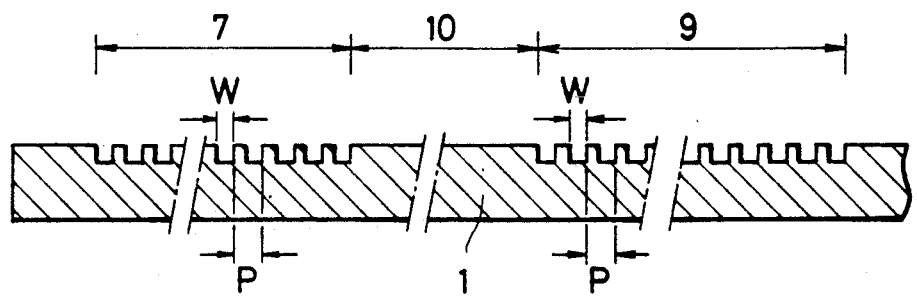
FIG. 4 is a schematic partial cross-sectional view of the optical disk of FIG. 2 taken along the line IV—IV, showing the structure of the index mark.
Figure 5A:
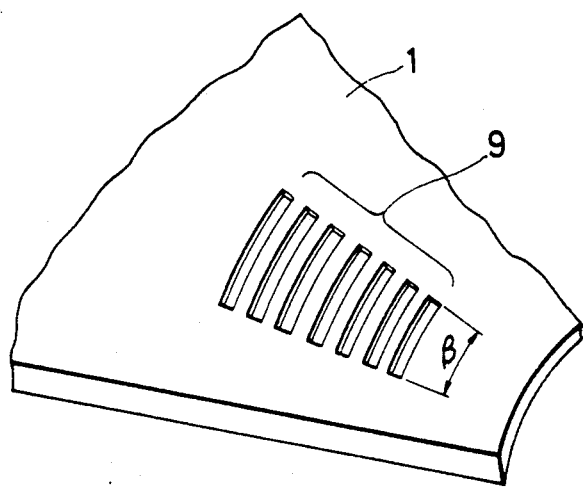
FIG. 5A is a schematic partial perspective view of the disk showing one example of the index mark.
Figure 5B:
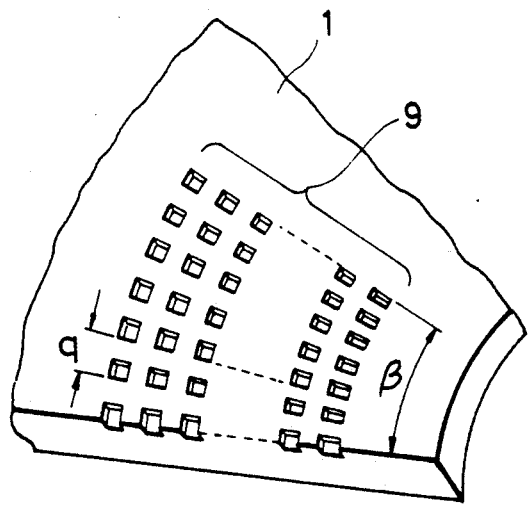
FIG. 5B is a schematic partial perspective view of the disk showing another example of the index mark.

FIG. 4 is a cross-sectional view taken along the line IV—IV of FIG. 2, showing the track region 7, the index mark 9 and a flat region 10 therebetween. The index mark 9 comprises a plurality of grooves having the same pitch P and groove width W as those of the guide tracks 2a, 2b . . .. Namely, the index mark 9 corresponds to the combination of a plurality of guide tracks each having a given length as shown in FIG. 2.

FIGS. 5A and 5B respectively show examples of the index mark 9 of FIGS. 2 and 4. In the example of FIG. 5A, the index mark 9 is actualized by forming a plurality of guide tracks having a uniform depth D, where the guide tracks are formed coaxially throughout an angle β with respect to the center of the disk 1 so that the index mark 9 takes a form of a sector. In the example of FIG. 5B, the index mark 9 comprises repetitive pits of a given period "q" in place of each uniform groove of FIG. 5A. Therefore, the amount of light reflected is greater in the arrangement of FIG. 5B than that of FIG. 5A. The pit period or pitch is selected to the order of the period of information pits. The pit period may also be selected to the order of the resolving power of an index mark detector, which will be described hereafter, while the pits may be aligned radially as shown in FIG. 5B so that the index mark 9 can be accurately and effectively reproduced. Since the index mark detector reproduces a signal having the pit period "q", it is possible to detect a rotation start signal from which undesirable influence, such as variation in reflection factor of the optical disk, vibrations of the disk, and external light interference, have been eliminated, by extracting this frequency component.

Figure 6:
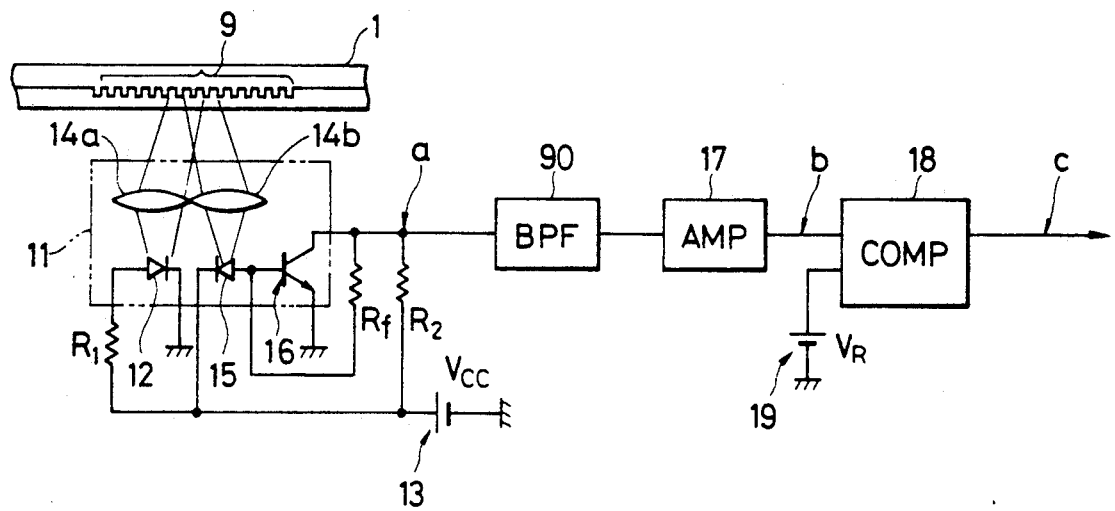
FIG. 6 is a schematic block diagram of a circuit used for detecting the index marks.

FIG. 6 is a block diagram of a reading circuit for detecting the index mark 9 from the optical disk 1. The reading circuit comprises an index mark detector 11 having a light-emitting element 12 and a light-receiving element 15. For instance, an optical reflective sensor HEDS-1000 manufactured by Hewlet Packard may be used. The light-emitting element 12 may be customary light-emitting diode (LED), and a constant D.C. current is applied via a bleeder resistor R1 from a voltage source 13 so that the LED 12 emits light continuously. The output light from the light-emitting element 12 is diaphragmed by a diaphragming lens 14a to produce a spot on the optical disk 1. The light is reflected at the optical disk 1 and is then condensed by a condensing lens 14b having a limited aperture so as to image a spot on a junction of the light-receiving element 15.

Since the reflected light from the optical disk 1 is scattered around by the index mark 9 whose surface has been made coarse by the concave-convexo arrangement, the amount of incident light on the light-receiving element 15 decreases compared to reflected light from other than the index mark 9. The change in the light amount becomes the change in the output current of the light-receiving element 15, where the output signal is then amplified by a transistor 16. A resistor R2 functions as a load of the transistor 16, and the output signal of the transistor 16 is fed back via a feedback resistor Rf to determine the voltage amplification factor of the transistor 16. The output signal "a" of the transistor 16 is fed via a band pass filter 90 to an amplifier 17 to be amplified therein, and then the output signal of the amplifier 17 is applied to a comparator 18 so that the waveform is shaped. The comparator 18 is also responsive to a reference voltage VR from a voltage source 19. The output signal of the comparator 18 will be used as a rotation starting point or position signal "c". This signal "c" indicative of a starting point of the disk rotation may be used to detect the angular position of the track address regions 8. In order to detect the angular position of the track address regions 8, the index mark 9 is located at a predetermined point having a given angle with the radially aligned track address regions 8 with respect to the center of the disk 1. The angular difference between the index mark and the track address regions 8 correspond to a given period of time, and therefore, this difference will be offset electrically.

Figure 7A:
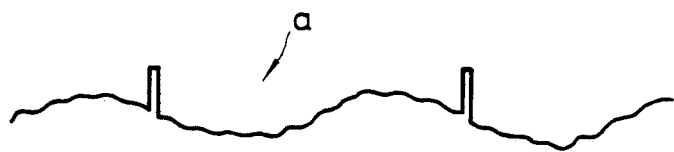
FIGS. 7A-7C are waveform chart showing various signals in the circuit of FIG. 6.
Figure 7B:
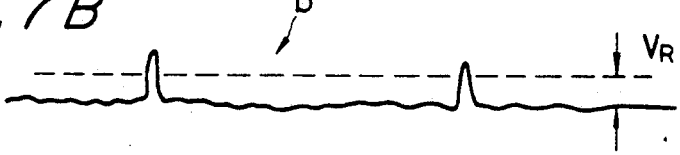
Figure 7C:
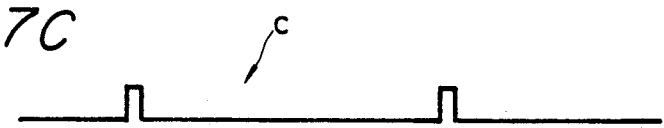

FIGS. 7A-7C are waveform charts showing various signals in the circuit of FIG. 6. The output signal "a" of the transistor 16, shown at FIG. 7A has amplitude variation due to the surface vibrations of the optical disk 1 and the change in the reflection factor, and this amplitude variation or fluctuation can be removed by limiting the frequency range by means of the band pass filter 90 (see the waveform of the output signal "b" of the amplifier 17, shown at FIG. 7B). As a result, only the reflected light component from the index mark 9 can be derived. The output signal "b" of the amplifier 17 is shaped by the comparator 18 to obtain the pulse train signal "c" having a desired waveform as shown in FIG. 7C.

Since the index mark 9 is formed by making the surface of the optical disk 1 coarse in the order of 1 micrometer in the same manner as the dimension of the guide tracks, the index mark 9 can be readily detected by an incoherent light source, such as a light-emitting diode, without using a laser light source. Therefore, the index mark 9 can be formed simultaneously with the guide tracks when cutting the original or master disk.

Figure 8:
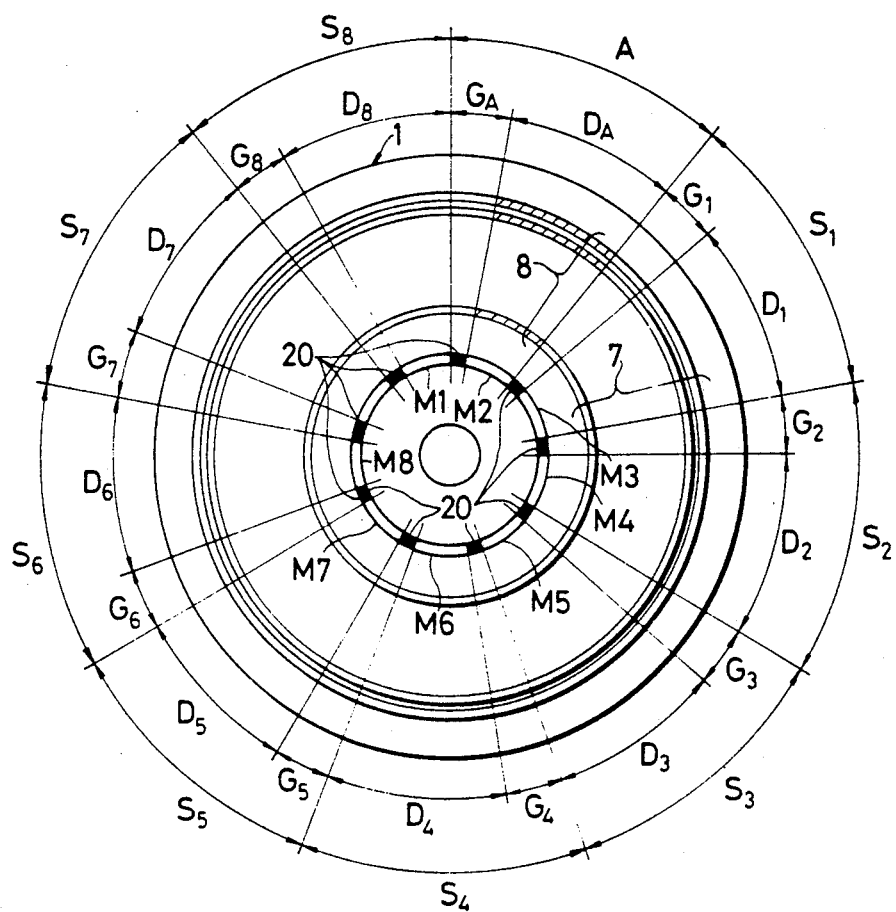
FIG. 8 is a schematic top plan view of another embodiment of an optical disk according to the present invention.

The above-described first embodiment may be suitable for recording and reproducing video signals, and a second embodiment of an optical disk which is suitable for digital signals will be described hereafter. FIG. 8 is a top plan view of the second embodiment optical disk which comprises a plurality of rotation index marks 20 corresponding to the index mark 9 of FIG. 2 and a plurality of sector index marks M1 to M8 indicative of positions of sector regions of the disk 1. These two kinds of index marks 20 and M1 to M8 are circularly arranged on a single band. The disk 1 comprises a recording track region 7 having groove-like guide tracks, a track address region A formed on the guide tracks in advance, and eight sector regions S1 to S8. The band having the two kinds of, index marks 20 and M1 to M8 is located inside the recording track region 7. The address region A comprises a separation or margin region GA and a track address data region DA, while each of the sector regions S1 to S8 comprises a separation or margin region G1, G2 . . . or G8, and a data recording region D1, D2 . . . or D8. The separation regions GA and G1 to G8 are not used for recording any information, and are provided for separating the data recording regions D1 to D8 from each other so that data is not erroneously written across two data recording regions.

Figure 9A:
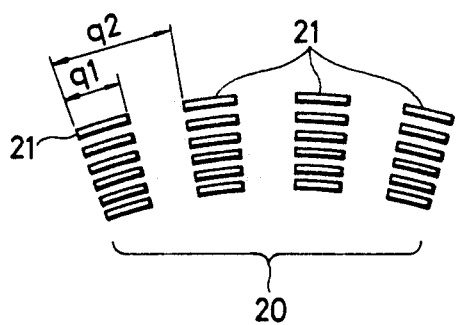
FIG. 9A is a schematic diagram showing the structure of the index mark of FIG. 8.
Figure 9B:
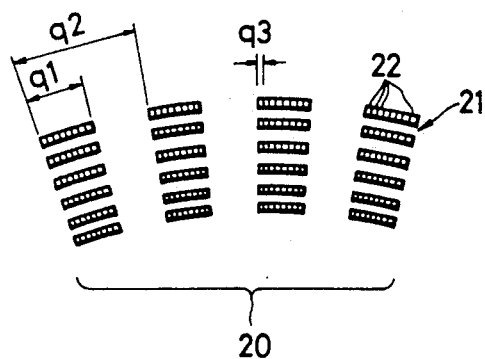
FIG. 9B is a schematic diagram showing another structure of the index mark of FIG. 8.

FIGS. 9A and 9B are enlarged views showing examples of the index mark 20 of FIG. 8. The example of FIG. 9A comprises a plurality of grooves 21 where each groove has a given depth and a length q1. A plurality of grooves 21 are arranged at a pitch q2 in a direction parallel to the circumference, and a plurality of rows of like grooves 21 are coaxially arranged to form a sector groove portion. The other example of FIG. 9B differs from the index mark of FIG. 9A in that each of the grooves 21 is formed of grooves 22 having a small pitch q3.

Turning back to FIG. 8, each of the sector index marks M1 to M8 is formed in the same manner as the index mark 9 of the first embodiment as shown in FIG. 5A or FIG. 5B. The rotation index marks 20 having a structure of FIG. 9A or FIG. 9B are arranged circularly in a direction parallel to the circumference together with the sector index marks M1 to M8 in such a manner that each rotation index mark 20 is interposed between two consecutive sector index marks. Since the structure of the rotation index marks 20 is different from that of the sector index marks M1 to M8, these two kinds of index marks can be readily distinguished from each other when reproducing. Namely, as will be described later in detail, a signal component indicative of the period q2 of the grooves 21 is selectively detected in a reading circuit. As an alternative, the angle β of the sector-like groove portion of each of the sector index marks M1 to M8 (see FIGS. 5A and 5B) may be made different from that of the rotation index marks 20 for distinguishing them from each other.

Figure 10:
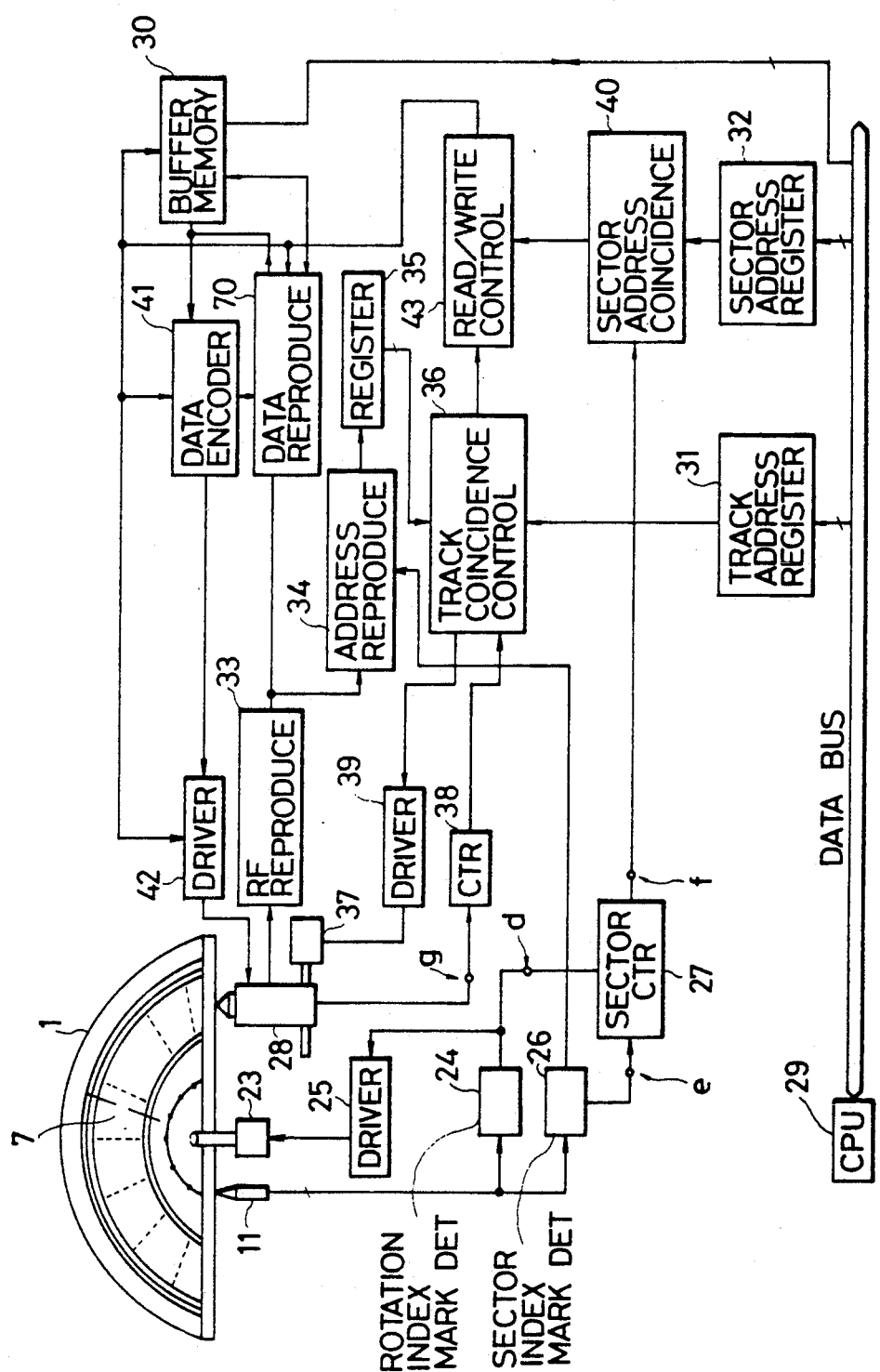
FIG. 10 is a schematic block diagram of an optical disk recording/reproducing apparatus used for the disk of FIG. 8.

FIG. 10 shows a block diagram of an optical disk recording and reproducing apparatus which writes and reads information on and from respective sectors of the second embodiment disk. The disk 1 having the structure of FIG. 8 is arranged to be rotated by a disk drive motor 23 so that the disk 1 spins stably. The apparatus of FIG. 10 comprises an index mark detector 11 which is substantially the same as that of FIG. 6. The output signal of the index mark detector 11 is fed to a rotation index mark detecting circuit 24 and to a sector index mark detecting circuit 26. The rotation index mark detecting circuit 24 produces a pulse train signal, and each pulse will be referred to as a rotation starting point pulse "d". The rotation starting point pulse "d" is fed to a disk drive motor driving circuit 25 so as to control the phasic synchronism of the disk drive motor 23.

The sector index mark detecting circuit 26 is responsive to a signal component indicative of the sector index marks M1 to M8 on the optical disk 1, and produces a pulse train signal accordingly where each pulse is referred to as a sector pulse "e". The structure of the above-mentioned rotation index mark detecting circuit 24 and the sector index mark detecting circuit 26 will be described with reference to FIG. 12 in connection with a following third embodiment. The number of the sector pulses "e" from the sector index mark detecting circuit 26 is counted by a sector counter 27, and thus the output signal of the sector counter 27 indicates the address of a sector of a track which is right above (or below) an optical head 28 through which reading and writing of information data are effected. The sector counter 27 is periodically reset by the rotation starting point pulse "d" corresponding to the rotation index mark 20 so that a sector address output "f" from the sector counter 27 will be initialized.

Writing operation in connection with a sector of a guide track on the optical disk 1 will be described with reference to FIG. 10. Data to be written is first transferred to a buffer memory 30 in accordance with the control by a CPU (central processing unit) 29. Then the CPU 29 sets a track address of a track, in which the data will be written, in a track address register 31, and also sets a sector address in a sector address register 32. When the CPU 29 emits a write instruction, a reproducing signal from the optical head 28 is equalized and shaped by an RF reproducing circuit 33 to be fed to a track address reproducing circuit 34. Address information of a track which is being tracking-controlled at present time is read out, and the read out address will be stored in a present track address register 35. The present track address will be compared with a writing track address from the aforementioned track address register 31 in a track address coincidence control circuit 36 so that an actuator 37 is driven to move the optical head 28 at a high speed in the case of noncoincidence. The movement of the optical head 28 is performed with the tracking control of the optical head switched off, by counting the number of crossing tracks represented by a track crossing signal of a tracking error signal by means of a crossing track number counter 38. Namely, the track address conincidence control circuit 36 determines the direction of the movement of the optical head 28 in accordance with the relationship between the present track address and the writing track address. When the difference between theses two addresses equals the number of crossing tracks represented by the output signal of the crossing track number counter 38, an actuator driving circuit 39 is controlled so as to stop the actuator 37.

When the optical head 28 faces the writing track, tracking control is effected, and then comparison between sector addresses is performed by a sector address coincidence circuit 40. When the sector address indicated by the output signal of the sector counter 27 conincides with a writing sector address from a sector address register 32, the output signal of the buffer memory 30 is modulated by a data encoder 41 to be supplied to a semiconductor laser driving circuit 42. The semiconductor laser driving circuit 42 controls a semiconductor laser (not shown) of the optical head 28 so that a laser light beam is applied to the optical disk 1 for effecting writing and reading. The intensity of the laser light beam is controlled so that optical modulation is effected in such a manner that the optical output whose power is sufficient for recording or writing is obtained for performing threshold writing. However, on reading, the output power of the semiconductor laser is set to a value which is much lower than that on writing so that the recording material of the optical disk 1 is not optically changed. In other words, the optical output level is maintained low so as not to rewrite or erase the prerecorded information. In the present invention, the optical output of the semiconductor laser is several milliwatts on reading, while the optical output is 10 milliwatts on writing.

A read/write control circuit 43 is provided to control the reading and writing operations of the apparatus. In detail, the read/write control circuit 43 is responsive to the output signals from the track address conincidence control circuit 36 and from the sector address conincidence circuit 40 for producing an output control signal when these two input signals coincide. The output control signal will be emitted after a given interval from the instant of conincidence and lasts for a predetermined interval so that the output control signal will be used as a gating signal in the data encoder 41, the buffer memory 30, the semiconductor laser driving circuit 42 and a data reproducing circuit 70 responsive to read out information from the RF reproducing circuit 33. After the data from the buffer memory 30 is written into a selected sector of the optical disk 1 via the optical head 28, the semiconductor laser driving circuit 42 is controlled so that its optical output is set to a low level to be prepared for subsequent writing or reading.

Data reading from a given sector will be performed in a similar manner to the above-described writing operation. Namely, the optical head 28 is moved and the rotation of the disk 1 is controlled so that the optical head 28 faces a selected track of a selected sector. After access of the optical head 28 is completed, the output signal of the RF reproducing circuit 33 is reproduced by the data reproducing circuit 70 and the reproduced data will be stored in the buffer memory 30.

Figure 11A:
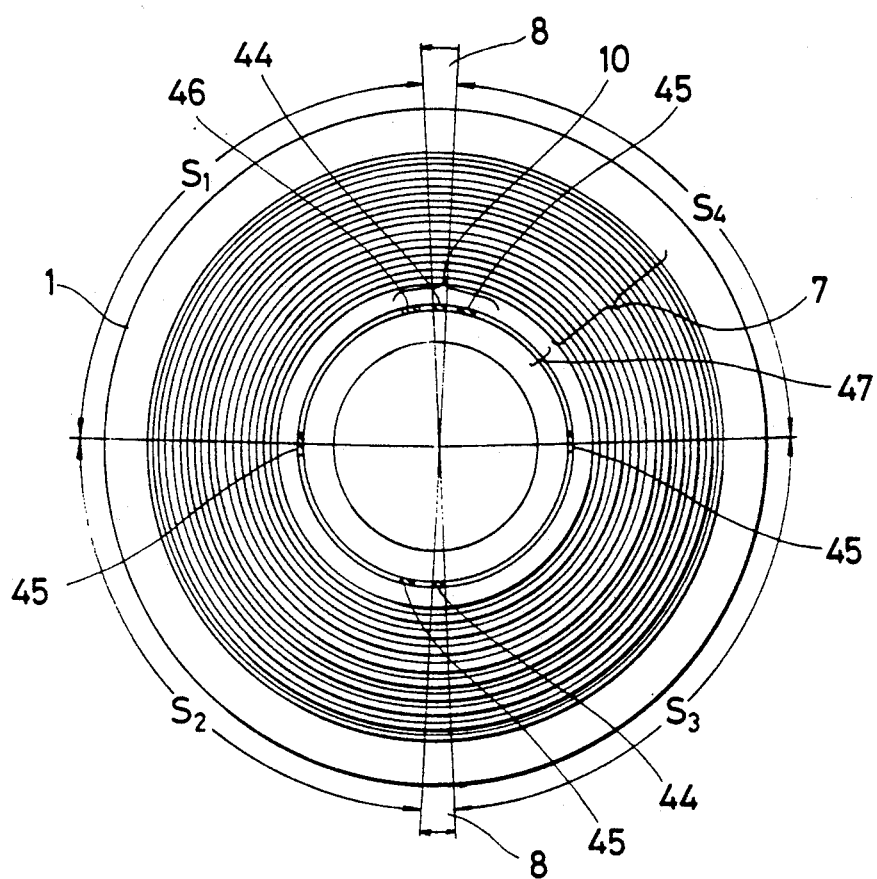
FIG. 11A is a schematic top plan view of another embodiment of an optical disk according to the present invention.

FIG. 11A shows a third embodiment of the optical disk according to the present invention. The third embodiment disk is used for recording mainly digital signals, and therefore, each track is divided into four sectors S1 to S4. The third embodiment disk differs from the previous embodiments in that two address information regions 8 are provided; one between the first and fourth sector regions S1 and S4, and the other between the second and third sector regions S2 and S3. Namely, each of the coaxially arranged tracks has two address recording sectors which are located oppositely to each other with respect to the center of the disk 1. Inside the guide track region 7, an annular index mark region 47 is provided coaxially, and two address index marks 44 each indicative of a starting point of the address information region 8 are respectively positioned within an arc portion of the index mark region 47 where the angle of the arc equals that of the address information region 8.

The reference 45 indicates sector index marks corresponding to the sector index marks M1 to M8 of FIG. 8, and the number of the sector index marks 45 equals the number of the sectors S1 to S4 (in this embodiment, the number is four). The reference 46 is a rotation index mark corresponding to the rotation index marks 9 and 20 of the previous embodiments.

Figure 11B:
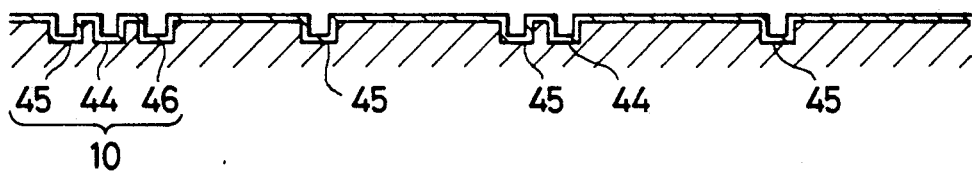
FIG. 11B is a schematic cross sectional view of the optical disk of FIG. 11A taken along the circular index track.

FIG. 11B shows a cross-sectional view of the disk 1 of FIG. 11A taken along the track of the index mark region 47. The above-mentioned various index marks 44, 45 and 46 are formed in the form of concave or recessed portions as shown in the cross section.

Figure 12:
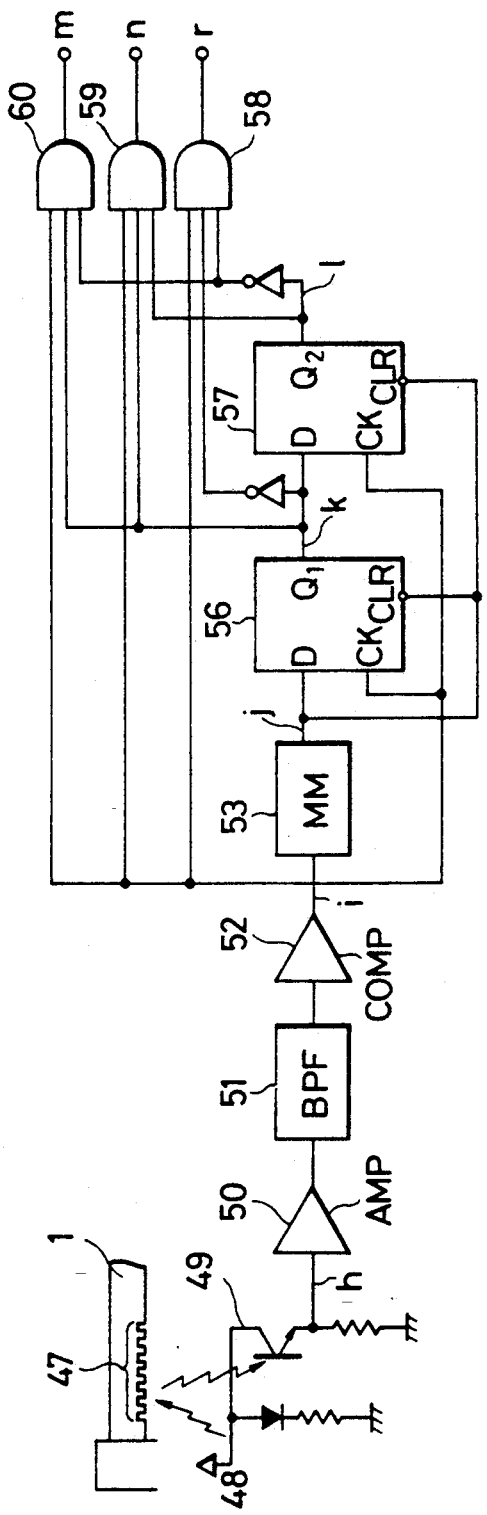
FIG. 12 is a schematic block diagram of a circuit used for detecting the index marks on the disk of FIG. 11.

FIG. 12 is a block diagram of a reading circuit which picks up various information from the index mark region 47 of the third embodiment disk 1. The circuit of FIG. 12 also functions as the combination of the rotation index mark detecting circuit 24 and the sector index mark detecting circuit 26 of the second embodiment of FIG. 10. Namely, the circuit of FIG. 12 has three output terminals for delivering three output signals "m", "n" and "r" which respectively correspond to the signals "e", "d" and the other output signal of the sector index mark detecting circuit 26 of FIG. 10.

Figure 13:
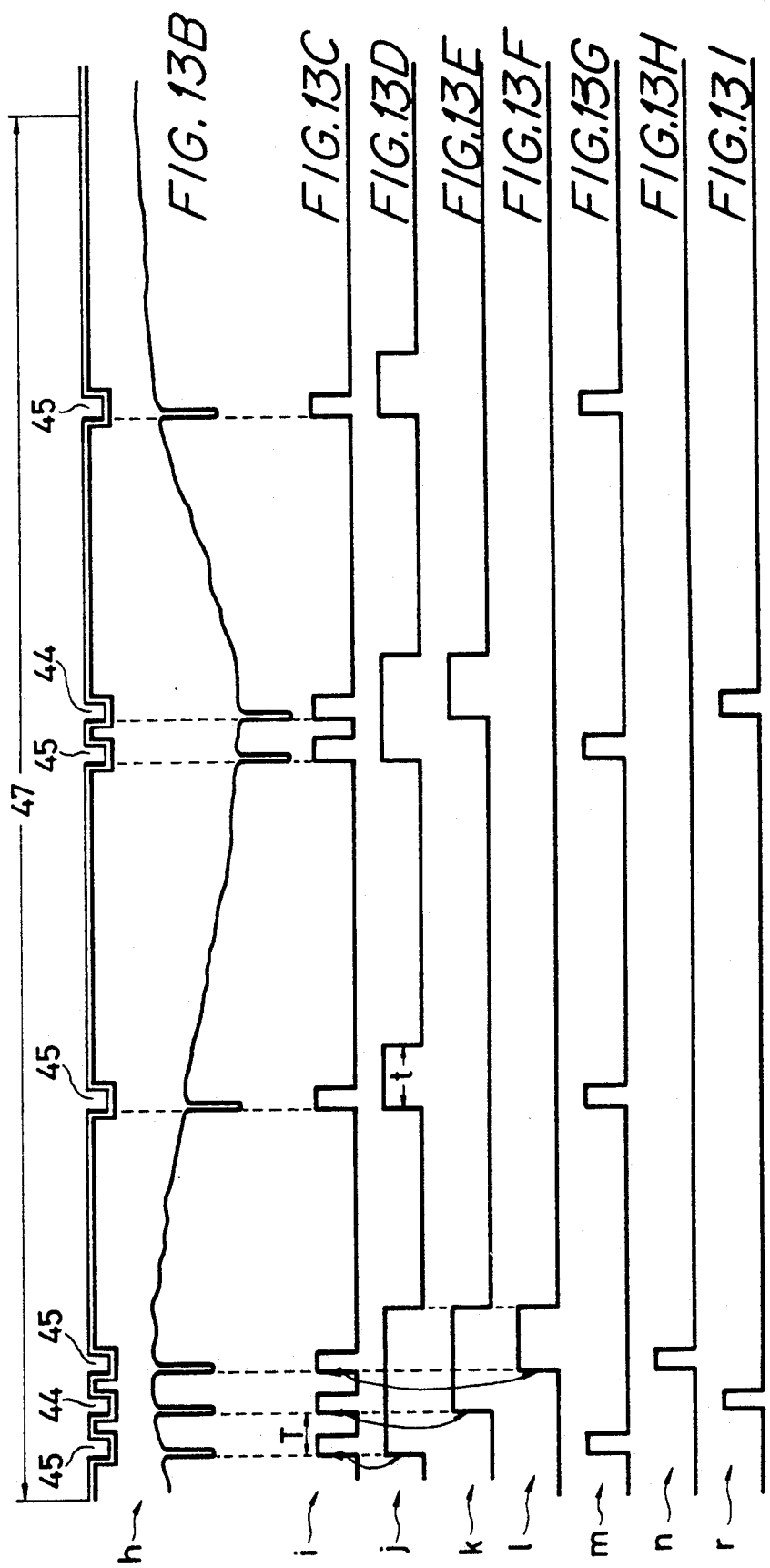
FIGS. 13A-13I are timing charts showing various signals in the circuit of FIG. 12.

In FIG. 12, incoherent light emitted from a light emitting diode 48 is applied to the index mark region 47 on the optical disk 1. When the light is applied to the index mark, the amount of light reflected thereat varies, and the variation will be detected by a phototransistor 49. A detection signal from the phototransistor 49 is fed to an amplifier 50, and is then supplied to a band pass filter 51 for removing from the received signal the variations in the amount of received light due to the vibrations of the surface of the optical disk 1. After this, the detection signal becomes a pulse train signal by means of a comparator 52. FIGS. 13A-13I are timing charts showing the waveforms of various signals in the circuit of FIG. 12. In FIG. 13A, the same cross-sectional view as FIG. 11B is shown for easy understanding of the relationship between the waveform of the signals and various index marks.

When the light from the light-emitting diode 48 is applied to the first index mark 45, the amplitude of the output signal of the phototransistor 49 becomes small because the light is scattered (see signal "h" at FIG. 13B). This signal "h" is processed in the above-described manner so that the comparator 52 produces an output pulse train signal "i" shown at FIG. 13C. Each of the pulses of signal "i" will be referred to as an index pulse hereafter, and this index pulse "i" is fed to a retriggerable multivibrator 53 so that the multivibrator 53 produces a pulse "j" shown at FIG. 13D having a width "t" (T<t<2T wherein T is the period of the index pulses "i" which would be obtained in the case that index marks are successively provided. The output pulse "j" of the multivibrator 53 is fed to a D-flip-flop 56 to be latched therein by the above-mentioned index pulse "i" functioning as a clock pulse. As a result, a pulse "k" shown at FIG. 13E is developed at the output terminal Q1 of the D-flip-flop 56, and this pulse "k" is fed to another D-flip-flop 57 which is also responsive to the index pulse "i" functioning as a clock pulse. An output pulse "l" shown at FIG. 13F, is developed at the output terminal Q2 of the latter D-flip-flop 57. Two inverters (without reference numerals) are provided to produce negative logic signals "k̄" and "l̄". An "and" output of the signals "i", "k̄" and "l̄" is produced by an AND gate 58 to deliver a sector, starting point detection signal "r", shown at FIG. 13I. A second AND gate 59 produces an "and" output of the signals "i", "k" and "l̄" as a rotation starting point detection signal "n", shown at FIG. 13H. A third AND gate 60 produces an "and" output of the signals "i", "k" and "l" as an address starting point detection signal "m", shown at FIG. 13G.

These index marks may be used not only for stably detecting the position of information on the disk 1 but also for controlling track-jumping operation during searching. For instance, in the case that information is prerecorded in the form of spiral tracks, it is sometimes necessary to repeatedly reproduce the data of a single track. In this case, it is required to perform track-jumping once a revolution.

Figure 14:
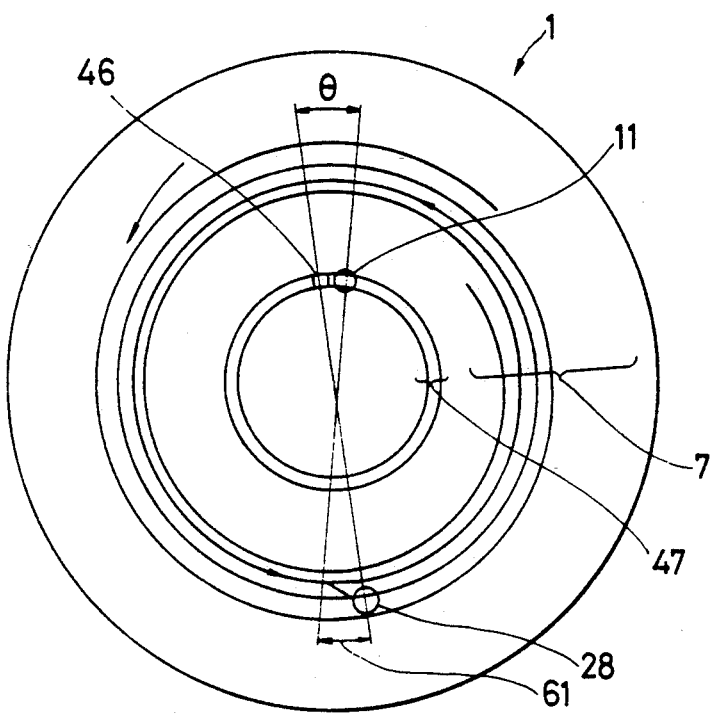
FIG. 14 is an explanatory view for the description of 1-track jumping on an optical disk having spiral guide tracks.

Jumping operation will be described with reference to FIGS. 14 and 15A-15E. The timing of jumping is basically determined by detecting the aforementioned rotation index mark 46. Since there is a time lag from the instant of detection of the rotation index mark 46 till the instant of performing track-jumping with the pickup of the optical head driven, the position of the optical detector 11 which detects the rotation index mark 46 is shifted by an angle $\theta$. With this arrangement, jumping is effected so that the information contained in a single track can be stably reproduced from the beginning of the address data. Since the optical head 28 starts jumping earlier as much as a period of time corresponding to the angle 8 as shown in FIG. 14, jumping is effected within a predetermined jumping section 61, and thus reproduction from the beginning of information can be possible. Timing of jumping will be further described with reference to timing charts of FIGS. 15A-15E.

Figure 15A:
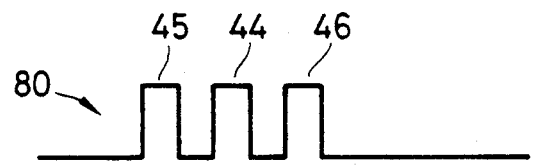
FIGS. 15A-15E are timing charts for the 1-track jumping.
Figure 15B:
Figure 15C:
Figure 15D:
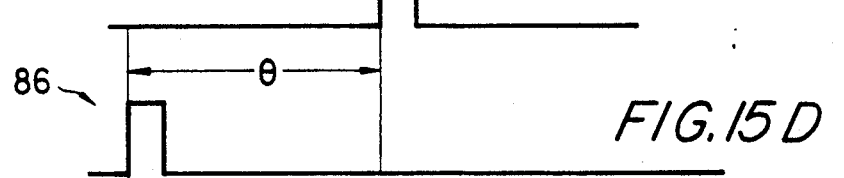
Figure 15E:
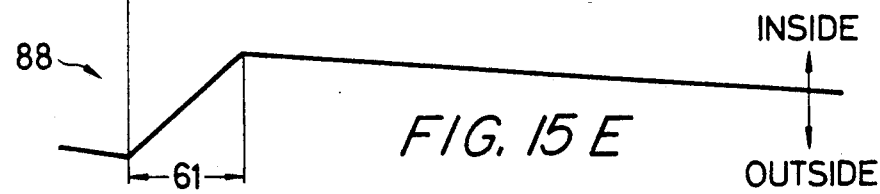

In FIG. 15A, the reference 80 is a waveform of detection pulses of the index marks, 82 is reproduced address data, shown at FIG. 15B which is positioned at the beginning of one track. information. A waveform 84, shown at FIG. 15C, indicates the position of rotation starting point detection pulse which would be obtained if the index mark detector 11 is not shifted. Namely, actual timing of the rotation starting point detection pulse is shifted by the angle $\theta$ as shown by a pulse 86, shown at FIG. 15D. Track-jumping is triggered by the leading edge of the pulse 86. The reference 88 indicates the movement of the optical head 28 in the radial direction or the disk 1, shown at FIG. 15E. With this operation, track-jumping will be completed within the jumping period or section 61 so that the optical head 28 is capable of reproducing information from its beginning.

Although it has been described in the above that information is to be recorded on one side of the optical disk 1, it is also possible to record information on both sides thereof as is well known. In this case, it is necessary to detect the front or back of the disk 1. The index mark according to the present invention may be used to ascertain the side of the disk 1. Namely, index marks having different structures are respectively formed on the both sides of the disk 1. For instance, the number of index marks or the width of the index mark may be made different from the other index mark on the opposite side. The difference in structure will be detected in the same manner as described in the above to ascertain the side which faces the optical head.

Figure 16A:
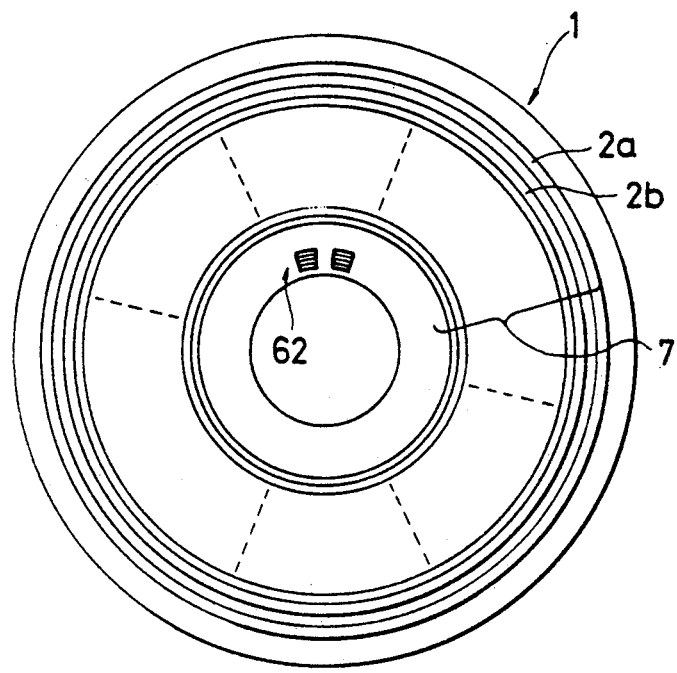
FIG. 16A is a schematic top plan view of another embodiment of an optical disk according to the present invention.
Figure 16B:
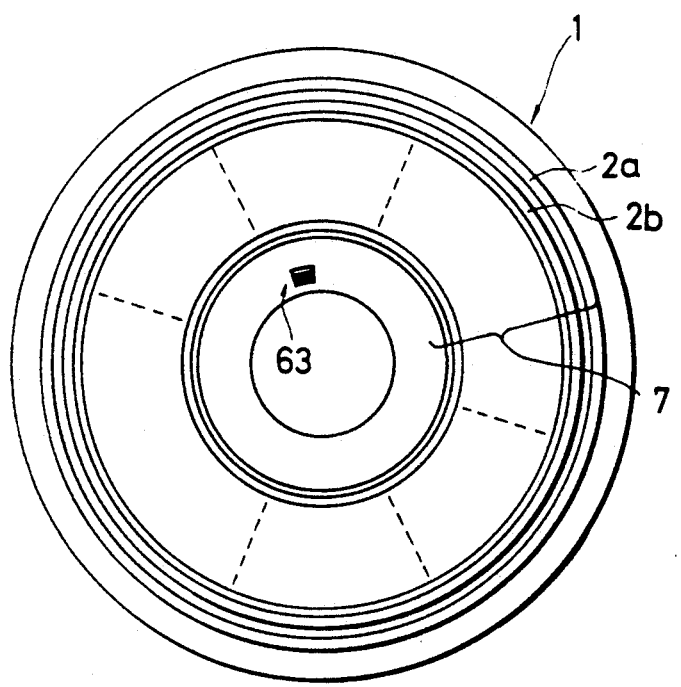
FIG. 16B is a schematic bottom plan view of the optical disk of FIG. 16A.

FIGS. 16A and 16B show a fourth embodiment of the optical disk according to the present invention, where the disk has index marks on its both sides for distinguishing the front and back sides from each other. The fourth embodiment optical disk 1 comprises two index marks 62 on its upper surface as shown in FIG. 16A, and one index mark 63 on its lower surface as shown in FIG. 16B. Each of the index marks 62 has the same groove, structure as the index mark described in the above with reference to FIGS. 5A and 5B. However, if desired, the structure of the index marks shown in FIGS. 9A and 9B may also be used.

In addition to, distinguishing between the sides of an optical disk, a similar index mark may be used to distinguish a disk from another. In other words, a plurality of kinds of disks may be distinguished from others by forming a specific index mark on disks of a given kind. Since the index mark can be used to ascertain the front or back side of a disk, and to ascertain the kind of a disk, there is an advantage that there is no need to scan a track carrying such information by means of a laser light beam. In the case that different intensity of reading laser beam and writing laser beam is required in accordance with the kind of the disk, suitable intensity of the laser light beam can be selected without energizing the laser.

As described in detail in the above, according to the present invention synchronism between the address information on each track and recording signal can be readily obtained so that information can be recorded immediately after the address information when recording a real-time signal, such as a video signal on an optical disk on which address information is written in each track so as to perform high-speed searching which is required in an optical memory having large capacity.

According to the present invention, since index mark(s) is used, rotation starting point, address information starting point and sector starting point can be readily and stably detected even in high-speed searching mode.

The index mark(s) used in the present invention comprises a phase structure made of concave-convexo groove(s) in the same manner as guide tracks. Therefore, the index mark(s) can be formed simultaneously at the time of cutting the master disk. This means that the phasic relationship between the index mark(s) and the address information of each track can be accurately set. In addition, since there is no need to provide a process of adding (an) index mark(s) to the finished product of the disk as the aforementioned conventional disks, the productivity of the optical disks according to the present invention is very high. Furthermore, since the index mark(s) can be detected by using an incoherent light source, timing of track-jumping and various information indicative of the side as well as the kind of the disk can be detected without using a laser light beam.

The above-described embodiments are just examples of the present invention, and therefore, it will be apparent for those skilled in the art that many modifications and variations may be made without departing from the spirit of the present invention.

What is claimed is:

1. An optical disk for optically recording and reproducing information thereon and therefrom, comprising:
   (a) a substrate, having coaxial or spiral guide tracks made in an annular region defined by a range of diameters between an inner diameter and an outer diameter with respect to the center of said disk;
   (b) a recording layer deposited on at least one side of said substrate, such that at least said annular region is covered by said recording layer; and
   (c) an indexing means for said disk including rotation index mark means indicative of a starting point of a single rotation of said disk, said indexing means being constructed of a grooved phase structure within said substrate, said grooved phase structure being substantially identical to a structure of said guide tracks, said rotation index mark means comprising a number of arcuate grooves each subtending a given angle with respect to the center of said disk, said indexing means being located in an area separated from said annular region by a space having a range of diameters different from the range of diameters defining said annular region such that said indexing means is spaced apart from said annular region by a given distance whereby a stationary detecting head may be used for detecting said indexing means.

2. An optical disk as claimed in claim 1, wherein said arcuate grooves are aligned radially in rows.

3. An optical disk as claimed in claim 2, wherein each of the arcuate grooves comprises a repetitive pattern of concave-convexo pits aligned in a direction parallel to the circumference of said disk.

4. An optical disk as claimed in claim 1, wherein said guide tracks comprise grooved tracks for recording main information therein, each of said guide tracks having at least a portion carrying its track address, the track address portions of said guide tracks being radially aligned to form a sectoral track address region.

5. An optical disk as claimed in claim 4, wherein said rotation index mark means is positioned so as to make a predetermined angle with said track address region with respect to the center of said disk.

6. An optical disk as claimed in claim 4 wherein said grooved phase structure of said indexing means and said grooved guide tracks have substantially identical depth dimensions.

7. An optical disk as claimed in claim 1, wherein said space separating the annular region from the area including said indexing means is defined by a range of diameters smaller than said range of diameters defining said annular region, so that said indexing means is located in an area surrounded by guide tracks provided for recording of said information.

8. An optical disk as claimed in claim 1, wherein said recording layer is deposited on both sides of said disk, said indexing means being located on one side of said disk, and further comprising another indexing means having a different structure from that of the first-mentioned indexing means for distinguishing said one and the other sides of said disk from each other.

9. An optical disk as claimed in claim 1 wherein said index mark means is located on a circumference having a diameter smaller than said inner diameter of said annular region.

10. An optical disk as claimed in claim 1 wherein said space separating said annular region and said area of said index mark means has a flat surface.

11. An optical disk for optically recording and reproducing information thereon and therefrom, comprising:
   (a) a substrate, having coaxial or spiral guide tracks made in an annular region defined by a range of diameters between an inner diameter and an outer diameter with respect to the center of said disk, said guide tracks including a plurality of information tracks for recording said information;
   (b) a recording layer deposited on at least one side of said substrate, such that at least said annular region is covered by said recording layer; and
   (c) an indexing means for said disk including rotation index mark means indicative of a starting point of a single rotation of said disk, said indexing means being constructed of a grooved phase structure within said substrate, said grooved phase structure having a dimension substantially identical to a dimension of said guide tracks, said rotation index mark means comprising a number of arcuate grooves each subtending a given angle with respect to the center of said disk, said indexing means being located in an area separated from said annular region by a space having a range of diameters different from the range of diameters defining said annular region such that said indexing means is spaced apart from said annular region by a given distance, and said indexing means further comprising a plurality of sector index mark means for dividing said information tracks into a plurality of sectoral regions, each of said sector index mark means being constructed of a grooved phase structure within said substrate and said recording layer.

12. An optical disk as claimed in claim 11, wherein said sector index mark means comprises a plurality of grooved portions aligned radially, each of said grooved portions being arcuate so that said grooved phase structure subtends a given angle with respect to the center of said disk.

13. An optical disk as claimed in claim 11, wherein said space is defined by a range of diameters smaller than said range of diameters defining said annular region, so that at least one of said rotation index mark means and said sector index mark means is located in an area surrounded by said information tracks provided for recording of said information.

14. An optical disk as claimed in claim 11, wherein said rotation index mark means and said sector index mark means are formed on an single band positioned in said area, said single band having a diameter smaller than said range of diameters of said annular region including said information tracks provided for recording of said information.

15. An optical disk as claimed in claim 11 wherein said indexing means further comprises a plurality of margin indexing means interleaved with said plural sector index mark means for identifying margin regions of said sectoral regions.

16. An optical disk for optically recording and reproducing information thereon and therefrom, comprising:
(a) a substrate, having coaxial or spiral guide tracks made in an annular region defined by a range of diameters between an inner diameter and an outer diameter with respect to the center of said disk, said guide tracks including a plurality of information tracks for recording said information;
(b) a recording layer deposited on at least one side of said substrate, such that at least said annular region is covered by said recording layer; and
(c) an indexing means for said disk including rotation index mark means indicative of a starting point of a single rotation of said disk, said indexing means being constructed of a grooved phase structure within said substrate, said grooved phase structure having a dimension substantially identical to a dimension of said guide tracks, said rotation index mark means comprising a number of arcuate grooves each subtending a given angle with respect to the center of said disk, said indexing means being located in an area separated from said annular region by a space having a range of diameters different from the range of diameters defining said annular region such that said indexing means is spaced apart from said annular region by a given distance, wherein said guide tracks comprise grooved tracks for recording main information therein, each of said guide tracks having at least a portion carrying its track address, the track address portions of said guide tracks being radially aligned to form a sectoral track address region, wherein said rotation index mark means is positioned so as to make a predetermined angle with said track address region with respect to the center of said disk, and wherein said indexing means further comprises a plurality of sector index mark means for dividing said information tracks into a plurality of sectoral regions; and address index mark means for indicating the position of said track address region, each of said sector index mark means being constructed of a grooved phase structure within said substrate and said recording layer.

17. An optical disk as claimed in claim 16, wherein each of said sector index mark means comprises arcuate portions formed of a repetitive pattern of concave-convexo pits aligned in a direction parallel to the circumference of said disk.

18. An optical disk as claimed in claim 16, wherein said rotation index mark means, said sector index mark means and said address index mark means are formed on a single band positioned in said area, said single band having a diameter smaller than said range of diameters of said annular region including said guide tracks.

19. An optical disk as claimed in claim 16 wherein said indexing means further comprises a plurality of margin indexing means interleaved with said plural sector index mark means for identifying margin regions of said sectoral regions.

20. An optical disk as claimed in claim 16 wherein said portion of said guide tracks carrying the track address thereof comprises a sector of said tracks, said address index mark means comprising a particular one of said plurality of sector index mark means.

21. An optical disk as claimed in claim 20 wherein each of said sector index mark means and said address index mark means comprises a margin indexing means for identifying margin regions of said sectoral regions.

22. An optical disk as claimed in claim 16 wherein each of said guide tracks comprises a plurality of portions carrying its track address radially aligned to form a plurality of sectoral track address regions, and wherein said address index mark means comprises a plurality of address indexing means for identifying said plurality of address regions.

23. An optical disk as claimed in claim 22 wherein said plurality of sector index mark means and said plurality of address indexing means are angularly arranged to alternate with one another.

24. A disk shaped data carrier having a centering hole and at least one prerecorded face wherein a first data is arranged along a set of turns having in common a geometric center, a first subset of said set of turns being allotted to the storage of said first data in adjacent track portions forming a pattern in registration with said first subset of turns, said prerecorded face comprising, around said centering hole;

a ring-shaped circular pattern of timing marks, wherein said marks are constituted by a second data which is related to a second subset of said set of turns with said second subset being separate and distinct from said first subset; said timing marks defining equal angular sectors bounded by radii crossing said common geometric center; each one of said angular sectors comprising at least one of said timing marks and a contiguous blank zone free from said second data, wherein said timing marks are made of strings of said second data arranged along the turns of said second subset.

25. Disk shaped carrier as claimed in claim 24, wherein the storage of data takes place within a ring shaped area of said prerecorded face; said ring shaped area surrounding said ring shaped circular pattern of timing marks.

* * * * *